Jan. 20, 1970  TOMOKAZU KAZAMAKI ET AL  3,490,826
HIGHLY CORRECTED ACHROMATIC LENS SYSTEM
Filed April 6, 1967

INVENTORS
TOMAKAZU KAZAMAKI
YASUO TAKAHASHI
BY Stanley Wolder
ATTORNEY

—

United States Patent Office 3,490,826
Patented Jan. 20, 1970

1

3,490,826
HIGHLY CORRECTED ACHROMATIC LENS SYSTEM
Tomokazu Kazamaki and Yasuo Takahashi, Tokyo-to, Japan, assignors to Asahi Kogaku Kogyo Kabushiki Kaisha, Tokyo-to, Japan, a corporation of Japan
Filed Apr. 6, 1967, Ser. No. 628,982
Claims priority, application Japan, Apr. 8, 1966, 41/21,780
Int. Cl. G02b 3/10
U.S. Cl. 350—2     1 Claim

ABSTRACT OF THE DISCLOSURE

A bright highly achromatic lens system employing lenses formed of artificial crystal materials having low refractive indices and large Abbe's number for negative lenses includes eight successively spaced lenses. The first, third, fifth, sixth, and eighth lenses are positive and the second, fourth and seventh lenses are negative and they are related and dimensioned to satisfy the following conditions whereby the aberrations are highly corrected:

$$F/0.9 > F_1 > F/1.2$$
$$F/0.9 > F_{1.2.3} > F/1.25$$
$$F/0.4 > F_{1.2.3.4.5} > F/0.8$$
$$0.2F < l_{10} < 0.5F$$
$$0.55F < l_8 + l_9 + l_{10} < 0.95F$$
$$3 > r_{12}/r_{13} > 1.2$$
$$0.15F > l_{12} > 0.02F$$

where in F is the focal length of the lens system, $r_j$ is the radius of curvature of the $j$th lens face, $F_{1.2\ldots n}$ is the resultant focal length of the first through the $n$th lense, and $l_i$ is the axial distance between the subscript designated lens face and the next successive lens face, the lenses being successively designated 1 to 8 and the lens faces being successively designed 1 to 16.

BACKGROUND OF THE INVENTION

The present invention relates generally to improvements in lens systems and it relates particularly to an improved bright highly achromatic objective lens system.

Employing conventional optical and commonly utilized glass it is impossible to obtain an optical lens system of very small chromatic aberration and an extended wavelength range of the tranversing light rays. For such purpose it is highly desirable to utilize recently developed artificial crystal substances. With many of these artificial crystal substances, however, the refractive index values are too small for achieving a bright lens, and the Abbe's number is relatively large for negative lenses, thus presenting great difficulty in satisfying the aforementioned purpose.

SUMMARY OF THE INVENTION

A principal object of the present invention is to provide an improved lens system.

Another object of the present invention is to provide an improved bright, highly achromatic lens system.

Still another object of the present invention is to provide an improved objective lens system employing arti-

2 ficial crystal materials for the lenses having small indices of refraction and large Abbe's number for negative lenses.

A further object of the present invention is to provide a lens system of the above nature possessing very little chromatic aberration and an extended wavelength range for traversing light rays.

The above and other objects of the present invention will be come apparent from a reading of the following description taken in conjunction with the accompanying drawing.

In a sense the present invention contemplates the provision of a lens system comprising eight lenses and satisfying the following conditions:

$$F/0.9 > F_1 > F/1.2$$
$$F/0.9 > R_{1.2.3} > F/1.25$$
$$F/0.4 > F_{1.2.3.4.5} > F/0.8$$
$$0.2F < l_{10} < 0.5F$$
$$0.55F < l_8 + l_9 + l_{10} < 0.95F$$
$$3 > r_{12}/r_{13} > 1.2$$
$$0.15F > l_{12} > 0.02F$$

wherein F is the resultant focal length of the lens system, $r_j$ is the radius of curvature of the $j$th lens face, $F_{1.2\ldots n}$ is the resultant focal length of the first to the $n$th lense and $l_i$ is the axial distance between the $i$th and the next successive lens face. Advantageously at least some of the lenses are formed of artificial crystal materials of low indices of refraction and the lenses are single element lenses axially spaced from each other.

A lense system possessing the above parameters overcomes the drawbacks attendant to the use of many of the artificial crystal optical materials while taking full advantage of the desirable optical properties thereof. The resulting lens system is bright and possesses very little chromatic aberration over an extended wavelength range.

DESCRIPTION OF THE PREFERRED EMBODIMENT

Figure 1:
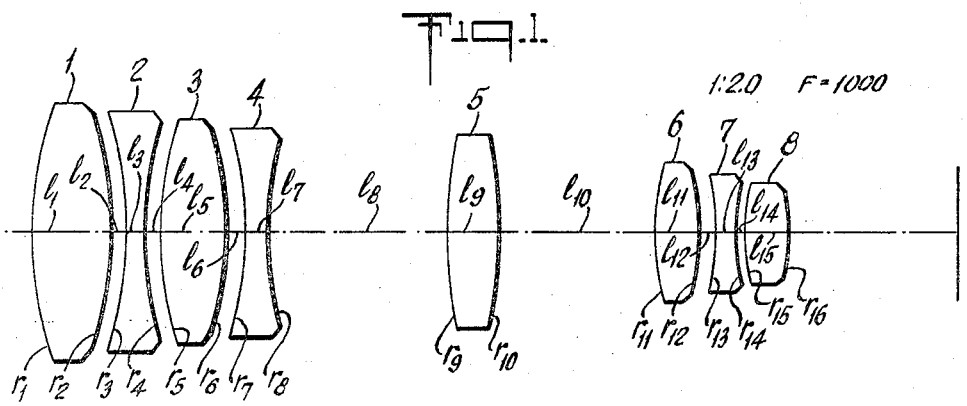
FIGURE 1 is a longitudinal sectional view of a lens system embodying the present invention.

Referring now to the drawing and particularly FIGURE 1 thereof which illustrates a preferred embodiment of the present invention, the improved lens system includes:

A first double convex positive lens $l$ of thickness $l_1$, index of refraction $n_1$, a front first face of radius of curvature $r_1$, and a rear second face of radius of curvature $r_2$;

A second negative double concave lense 2 spaced from lense 1 a distance $l_2$, and having a thickness $l_3$, an index of refraction $n_2$, a front third face of radius of curvature $r_3$ and a rear fourth face of radius of curvature $r_4$;

A third positive double convex lens 3 spaced from lens 2 a distance $l_4$, and having a thickness $l_5$, an index of refraction $n_3$, a front fifth face of radius of curvature $r_5$ and a rear sixth face of radius of curvature $r_6$;

A fourth negative double concave lens 4 spaced from lens 3 a distance $l_6$, and having a thickness $l_7$, an index of refraction $n_4$, af ront seventh face of radius of curvature $r_7$ and a rear eighth face of radius of curvature $r_8$;

A fifth positive double convex or plano-convex lens 5 spaced from the lens 4 a distance $l_8$, and having a thickness $l_9$, an index refraction $n_5$, a front ninth face of radius of curvature $r_9$ and a rear tenth face of radius of curvature $r_{10}$;

A sixth positive double convex lens 6 spaced from the lens 5 a distance $l_{10}$, and having a thickness $l_{11}$, an index of refraction $n_6$, a front eleventh face of radius of curvature $r_{11}$ and a rear twelfth face of radius of curvature $r_{12}$;

A seventh negative double concave lens 7 spaced from the lens 6 a distance $l_{12}$, and having a thickness $l_{13}$, an index of refraction $n_7$, a front thirteenth face of radius of curvature $r_{13}$ and a rear fourteenth face of radius of curvature $r_{14}$; and An eighth positive double convex lens 8 spaced from the lens 7 a distance $l_{14}$, and having a thickness $l_{15}$, an index of refraction $n_8$, a front fifteenth face of radius of curvature $r_{15}$ and a rear sixteenth face of curvature $r_{16}$.

The distances between lenses are between the confronting faces of adjacent lenses and along the optical axis and the lens thicknesses are along the optical axis.

The dimension, spacings and properties of the lenses are such that the lens system satisfies the following conditions:

$$F/0.9 > F_1 > F/1.2$$
$$F/0.9 > F_{1.2.3} > F/1.25$$
$$F/0.4 > F_{1.2.3.4.5} > F/0.8$$
$$0.2F < l_{10} < 0.5F$$
$$0.55F < l_8 + l_9 + l_{10} < 0.95F$$
$$3 > r_{12}/r_{13} > 1.2$$
$$0.15F > l_{12} > 0.02F$$

where F is the resultant focal length of the lens system, $r_j$ is the radius of curvature of the $j$th surface, $F_{1.2 \ldots n}$ is the resultant focal length of up to the $n$th lens, and $l_i$ is the distance between the $i$th lens face and the next successive lens face, that is a lens thickness or spacing.

The conditions (1), (2) and (3) provide the lens power combination which is an important concept of the present invention, thereby reducing the entire resultant chromatic aberration of the lens system to a very great extent. Thus, in a lens system arranged in a P-N-P-N-P series (P: positive; N: negative), to each of the positive and negative lenses there is provided a characteristic, one different from the other, so as to change chromatic aberration factor, leading to a reduction of the chromatic aberration. Further, these conditions serve to prevent any aggravation of the various aberrations by weakening the lens power and also to minimize or prevent spherical aberration from remaining, as far as possible, in such a bright lens system.

The conditions (4) and (5) serve, in association with the conditions (2) and (3), to eliminate astigmatism in that portion of the lens system which is beyond the eleventh surface. Thus, when the lens power satisfies the condition (2) and the lens arrangement satisfies the condition (5), it is possible to impart a negative astigmatism coefficient to the beyond eleventh surface portion of the lens system, with relatively small influence on other aberrations. From the point of view of chromatic aberration, the arrangement under the conditions (3) and (4) is considered suitable. Under the lens power condition (3), the condition (4) is suitable. If $F_{1.2.3.4.5}$ should be smaller and $l_{10}$ should be shorter, then the remaining amount of other aberrations would be increased, the balance would be lost and astigmatism correction in said beyond eleventh surface portion would be hindered. The conditions (6) and (7) are necessary for properly balancing aberrations at the surfaces $r_{12}$ and $r_{13}$.

The data of one example of a lens system in accordance with the present invention is as follows wherein F=1000:

TABLE 1

| | | |
|---|---|---|
| $r_1$=797.000 | $l_1$=150.00 | $n_1$=1.43387/95.2 |
| $r_2$=−803.031 | $l_2$=30.00 | |
| $r_3$=−759.000 | $l_3$=50.00 | $n_2$=1.45854/68.0 |
| $r_4$=1374.662 | $l_4$=15.00 | |
| $r_5$=755.000 | $l_5$=130.00 | $n_3$=1.43387/95.2 |
| $r_6$=−938.033 | $l_6$=40.00 | |
| $r_7$=−700.000 | $l_7$=40.00 | $n_4$=1.45854/68.0 |
| $r_8$=708.068 | $l_8$=350.00 | |
| $r_9$=870.000 | $l_9$=100.00 | $n_5$=1.43387/95.2 |
| $r_{10}$=−1868.980 | $l_{10}$=300.00 | |
| $r_{11}$=538.000 | $l_{11}$=80.00 | $n_6$=1.43387/95.2 |
| $r_{12}$=−706.503 | $l_{12}$=40.00 | |
| $r_{13}$=−470.000 | $l_{13}$=40.00 | $n_7$=1.45854/68.0 |
| $r_{14}$=420.735 | $l_{14}$=13.00 | |
| $r_{15}$=665.000 | $l_{15}$=80.00 | $n_8$=1.43387/95.2 |
| $r_{16}$=−579.364 | | |

The Seidel coefficients of this example are as follows:

TABLE 2

| | S1 | S2 | S3 | P | S5 |
|---|---|---|---|---|---|
| 1 | 0.416 | 0.332 | 0.264 | 0.379 | 0.513 |
| 2 | 3.694 | −1.348 | 0.492 | 0.376 | −0.317 |
| 3 | −3.787 | 1.290 | −0.439 | −0.414 | 0.291 |
| 4 | −0.005 | −0.015 | −0.040 | −0.228 | −0.727 |
| 5 | 0.121 | 0.165 | 0.224 | 0.400 | 0.848 |
| 6 | 2.429 | −0.684 | 0.192 | 0.322 | −0.145 |
| 7 | −3.163 | 0.585 | −0.108 | −0.449 | 0.103 |
| 8 | −0.139 | −0.244 | −0.428 | −0.444 | −1.531 |
| 9 | 0.054 | 0.157 | 0.450 | 0.347 | 2.289 |
| 10 | 0.277 | −0.065 | 0.015 | 0.161 | −0.041 |
| 11 | −0.006 | −0.053 | −0.411 | 0.562 | 1.161 |
| 12 | 1.444 | 1.659 | 1.907 | 0.428 | 2.684 |
| 13 | −1.708 | −2.295 | −3.082 | −0.668 | −5.039 |
| 14 | 0.004 | 0.041 | 0.380 | −0.747 | −3.394 |
| 15 | 0.000 | −0.008 | −0.423 | 0.455 | 1.619 |
| 16 | 0.521 | 0.665 | 0.849 | 0.522 | 1.751 |
| Sum | 0.154 | 0.183 | −0.158 | 1.005 | 0.066 |

Figure 2:
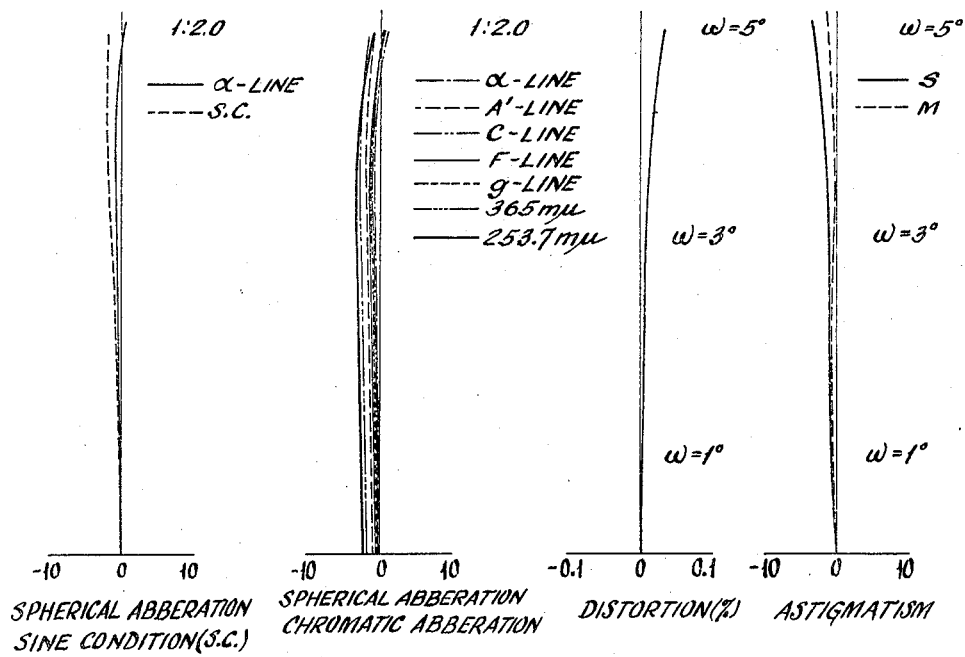
FIGURE 2 is a set of aberration curves thereof.

The aberration, distortion and astigmatism curves shown in FIGURE 2 of the drawing illustrate the excellent properties of the specific example of the present lens system.

It should be noted that in the specific example of the present lens system set forth above the positive lenses, lenses 1, 3, 5, 6, and 8 are formed of calcium fluoride and the negative lenses, lenses 2, 4 and 7 are formed of fused quartz.

While there have been described and illustrated a preferred embodiment of the present invention, it is apparent that numerous alterations, omissions and additions may be made without departing from the spirit thereof.

What is claimed is:

1. A lens system comprising eight lenses, herein consecutively designated as the first to the eighth lens, and having sixteen faces, herein consecutively designated as the first to the sixteenth face and having the following dimensions and relationships:

| | | |
|---|---|---|
| $r_1 = .797000F$ | $l_1 = .15000F$ | $n_1 = 1.43387/95.2$ |
| $r_2 = -.803031F$ | $l_2 = .03000F$ | |
| $r_3 = -.759000F$ | $l_3 = .05000F$ | $n_2 = 1.45854/68.0$ |
| $r_4 = 1.374662F$ | $l_4 = .01500F$ | |
| $r_5 = .755000F$ | $l_5 = .13000F$ | $n_3 = 1.43387/95.2$ |
| $r_6 = -.938033F$ | $l_6 = .04000F$ | |
| $r_7 = -.700000F$ | $l_7 = .04000F$ | $n_4 = 1.45854/68.0$ |
| $r_8 = .708068F$ | $l_8 = .35000F$ | |
| $r_9 = .870000F$ | $l_9 = .10000F$ | $n_5 = 1.43387/95.2$ |
| $r_{10} = -1.868980F$ | $l_{10} = .30000F$ | |
| $r_{11} = .538000F$ | $l_{11} = .08000F$ | $n_6 = 1.43387/95.2$ |
| $r_{12} = -.705503F$ | $l_{12} = .04000F$ | |
| $r_{13} = -.470000F$ | $l_{13} = .04000F$ | $n_7 = 1.45854/68.0$ |
| $r_{14} = .420735F$ | $l_{14} = .01300F$ | |
| $r_{15} = .665000F$ | $l_{15} = .08000F$ | $n_8 = 1.43387/95.2$ |
| $r_{16} = -.579364F$ | | | wherein F is the focal length of the lens system, $r_j$ is the radius of curvature of the $j$th lens face, $l_i$ is the axial distance between the subscript designated lens face and the next successive lens face, and $n_n$ is the index of refraction of the $n$th lens.

References Cited
UNITED STATES PATENTS 2,487,873 11/1949 Herzberger et al. _____ 350—177
2,685,230 8/1954 Baker _____ 350—214 X JOHN K. CORBIN, Primary Examiner U.S. Cl. X.R.

350—177, 214